UNITED STATES PATENT OFFICE.

HENRY A. GARDNER, OF WASHINGTON, DISTRICT OF COLUMBIA.

RECOVERING PICRIC ACID FROM WASHWATER.

1,231,009.  Specification of Letters Patent.  Patented June 26, 1917.

No Drawing.   Application filed December 16, 1915.   Serial No. 67,273.

*To all whom it may concern:*

Be it known that I, HENRY A. GARDNER, a citizen of the United States, residing at Washington, District of Columbia, have invented a new and useful Improvement in Recovering Picric Acid from Washwater, of which the following is a full, clear, and exact description.

The object of my invention is to recover picric acid from wash water containing picric acid in solution. In the manufacture of picric acid, the crystals are washed with water to remove the impurities incident to the process of manufacture. Picric acid goes into solution in the wash water to the extent of about 1 per cent. at ordinary room temperatures. The loss thus occasioned is ofttimes very great to the producer, especially when prolonged washing with large amounts of water is necessary. Moreover, such wash water is intensely yellow in color and cannot be disposed of in the same manner as most industrial liquors.

In order that the process may be practised by those skilled in the art I shall describe a preferred way of carrying it out, it being understood that the detailed procedure need not be followed so long as the essential steps recited in the claims are adhered to.

To 100 pounds (12 gallons) of the wash water there are added 20 pounds of sodium bisulfate ($NaHSO_4$), known commercially as niter cake, preferably in a finely divided condition. The liquid may be stirred until the bisulfate dissolves. A liquor of approximately 17° Baumé (1.130–1.140 sp. gr.) results. At this strength, practically all of the picric acid is thrown out of solution in a flocculent condition, rising to the surface of the heavy liquor.

The picric acid is now removed by filtration. To the wash water liquor which is now very light in color, may be added a very small quantity, say from 1 to 5 per cent. of a bleaching powder, preferably oxychlorid of lime. The liquor which contains the free sulfuric acid present in the $NaHSO_4$ causes liberation of chlorin in sufficient quantity to bleach any slight traces of picric acid present. The liquor is stirred until decolorized. The purpose of this step is merely to destroy the slight yellow color of the water so that it may, without objection, be disposed of in the ordinary way.

Having now fully described my invention, what I claim and desire to protect by Letters Patent is—

1. The process of recovering picric acid from wash water which consists in adding to the wash water sodium bisulfate, in such amount as to form a high gravity solution in which the picric acid is substantially insoluble and from which the picric acid is thrown out in a flocculent form that floats to the surface, thereby facilitating its removal.

2. The process of recovering picric acid from wash water containing the same which consists in adding to the wash water sodium bisulfate, thereby throwing the picric acid out of solution, removing the picric acid, and adding bleaching powder to the wash water to liberate chlorin in order to thoroughly decolorize the liquid.

In testimony of which invention, I have hereunto set my hand, at Philadelphia, on this 11th day of December, 1915.

HENRY A. GARDNER.